May 19, 1931.  A. J. BATES  1,805,797
LATH FASTENER
Filed Oct. 11, 1926
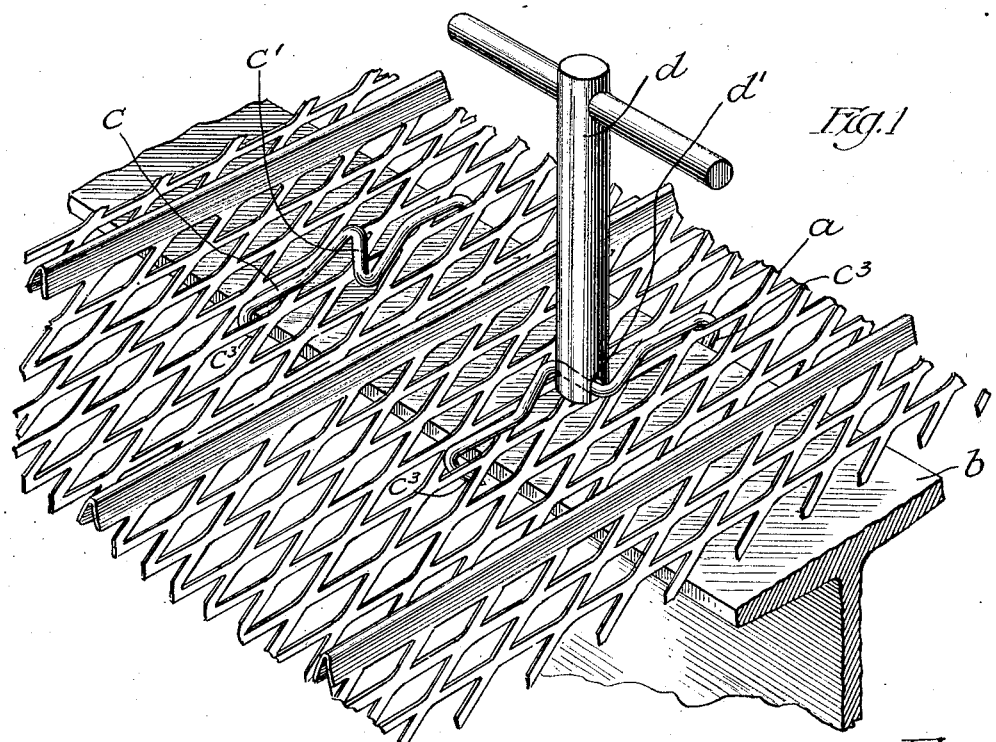
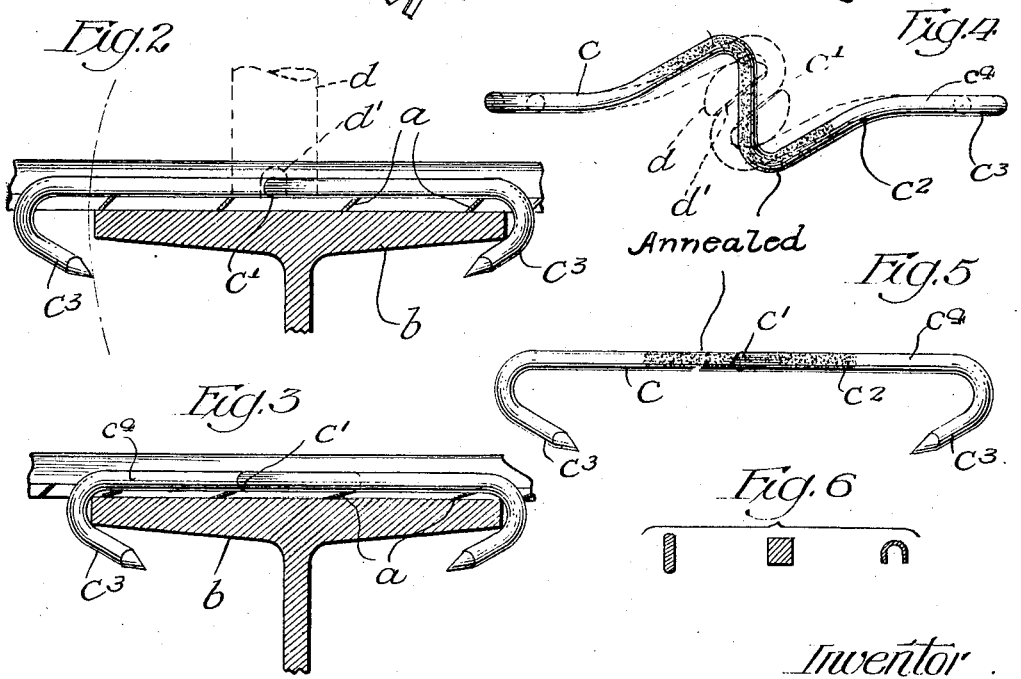
Inventor
Albert J. Bates
By Fred Gerlach
Atty.

Patented May 19, 1931

1,805,797

UNITED STATES PATENT OFFICE

ALBERT J. BATES, OF CHICAGO, ILLINOIS, ASSIGNOR, BY MESNE ASSIGNMENTS, TO BATES EXPANDED STEEL CORPORATION, OF EAST CHICAGO, INDIANA, A CORPORATION OF DELAWARE

LATH FASTENER

Application filed October 11, 1926. Serial No. 140,705.

The invention relates to devices for fastening lath in place and more particularly to devices which are adapted to secure the lath to metal beams, joists or studs.

The object of the invention is to provide a simple and efficient device which can be produced at a low cost and which may be quickly inserted through the lath and tightened to secure it in place.

The invention consists in the several novel features hereinafter set forth and more particularly defined by the claims at the conclusion hereof.

In the drawings: Fig. 1 is a perspective showing a strip of metallic lath and a plurality of the improved attaching devices. Fig. 2 is a transverse section, showing one of the fasteners before it has been tightened to secure the lath to a beam. Fig. 3 is a similar view, showing the fastener after it has been manipulated to secure the lath to a beam. Fig. 4 is an inverted plan view of the fastener. Fig. 5 is a side elevation. Fig. 6 shows sections of different strips of metal which may be used in forming the fasteners.

The invention is exemplified in a fastener which is adapted primarily to secure an expanded metal lath A to a flanged metal joist B. The fastener is preferably formed of a single strip $c$ of round wire, which is normally bent to form a central transverse portion $c'$, outwardly extending oblique portions $c^2$ and substantially aligned end-portions $c^4$ terminating in hooks $c^3$. The hooks are bent to extend toward each other, and normally the points of the hooks are spaced apart sufficiently to permit the hooks to be slipped over the edges of the beam flange and the connecting portions to extend across the face of the flange and the strands of the lath which lap the beam. In placing the fastener in position, one hook is first extended through the lath and around one edge of the beam, and the other hook may then be pushed through one of the meshes of the lath and clear of the beam, as shown in Fig. 2. After the fastener has been thus placed in position, a suitable key or wrench $d$ with a cross-slot $d'$ in its end will be applied to the transverse portion $c'$ and then rotated. This operation will bend the transverse portion and draw the hook $c^3$ which has been last inserted toward the hook engaging the beam until both hooks are interlocked with the beam flange, and also tightens the portion of the fastener between the hooks so it will force the lath tightly against the face of the beam flange.

The strip of metal used in the fastener is preferably of sufficient softness or ductility to permit the bending desired. If, however, it is desirable that the hook portions and the draw-portions $c^4$ should be sufficiently hard to prevent them from yielding under the tension applied in securing the lath in place, the fasteners are formed from hard metal stock having sufficient strength and hardness to prevent bending of the hook ends $c^3$ and $c^4$ by hand power applied through the medium of the wrench $d$. Then, the central portion $c^1$ of the fastener is annealed and softened so that the hand power applied to the wrench $d$ will bend it easily and draw the hooks together.

The invention exemplifies a fastener for attaching metallic lath to metal supports which can be formed of a single strip of metal and which can be readily and quickly applied to secure the lath. While preferably the fastener is formed of round wire, strips of the cross-sectional shapes shown in Fig. 6 may be used.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A fastener for securing lath to metal supports comprising a single strip of metal provided with hooks at its ends to clasp a support between them, and a connecting portion to lap and hold the lath, for drawing the hooks together to interlock the support, having end and central portions of relatively hard and soft metal to retard and facilitate bending respectively.

2. A fastener for securing a lath to a flanged beam, formed from a single strip of metal and consisting of a pair of oppositely facing hook-members adapted to extend through the lath, and an intermediate connecting member for bearing against the lath, said connecting member being normally of such length that the hook-members may be manipulated without flexure to straddle the beam-flange and being sufficiently pliable to permit the central portion thereof to be bent or twisted relatively to the end portions in order to bring said end portions towards each other and thereby cause the hook members to be drawn into interlocking relation with said flange.

3. A fastener for securing a lath to a flanged beam, formed from a single strip of metal and consisting of a pair of oppositely facing hook-members adapted to extend through the lath, and an intermediate connecting member for bearing against the lath, said connecting member being normally of such length that the hook-members may be shifted without flexure to straddle the beam flange and having a straight and transverse central portion adapted to fit in a kerf or slot in a turning tool and sufficiently pliable to be bent by the tool relatively to the end portions of the connecting member in order to bring said end portions towards each other and thereby cause the hook-members to be drawn into interlocking relation with said flange.

4. A fastener for securing a lath to a flanged beam, formed from a single strip of metal and consisting of a pair of oppositely facing hook-members adapted to extend through the lath, and be positioned adjacent the beam-flange, and an intermediate connecting member for bearing against the lath, said connecting member being pliable and comprising a pair of longitudinally aligned end portions connected to the hook-members respectively, a central portion extending normally at right angles to said end portions, and a pair of oblique connecting portions between the ends of said central portion and the end portions, the central portion of the intermediate connecting member being adapted to receive a turning tool and be bent thereby together with the oblique portions to draw the hook-members towards each other and interlock them with said flange.

5. A fastener for securing a lath to a flanged beam, consisting of a pair of oppositely facing hook-members adapted to extend through the lath and be positioned adjacent the beam-flange, and an intermediate member adapted to bear against the lath and having the ends thereof formed integrally with the hook-members, the central portion of said intermediate member being formed of soft metal and being readily bendable to draw the hook-members towards each other and interlock them with said flange.

6. A fastener for securing a lath to a flanged beam, consisting of a pair of oppositely facing hook-members formed of comparatively hard metal and adapted to extend through the lath and be positioned adjacent the beam-flange, and an intermediate connecting member for bearing against the lath, the central portion of said connecting member being formed of soft metal and being readily bendable to draw the hook-members toward each other and interlock them with said flange.

Signed at East Chicago, Indiana, this 13th day of September, 1926.

ALBERT J. BATES.